United States Patent [19]

Weller

[11] Patent Number: 5,953,915
[45] Date of Patent: Sep. 21, 1999

[54] DEVICE FOR TIME-DEPENDENT CONTROL OF THE DURATION OF REGENERATION OF AN AIR DRYER

[75] Inventor: Rolf Weller, Pluederhausen, Germany

[73] Assignee: Robert Bosch GmbH, Stuttgart, Germany

[21] Appl. No.: 09/116,894

[22] Filed: Jul. 17, 1998

[30] Foreign Application Priority Data

Jul. 17, 1997 [DE] Germany .......................... 197 30 636

[51] Int. Cl.⁶ .................................................. F16D 31/02
[52] U.S. Cl. ................................ 60/403; 92/132; 92/133
[58] Field of Search .......................... 60/403; 92/130 R, 92/132, 133

[56] References Cited

U.S. PATENT DOCUMENTS

| | | | |
|---|---|---|---|
| 3,195,416 | 7/1965 | Linquist | 92/133 X |
| 3,613,520 | 10/1971 | Worden | 92/133 |
| 3,618,473 | 11/1971 | Miller | 92/133 X |
| 4,651,626 | 3/1987 | Messina | 92/133 X |

FOREIGN PATENT DOCUMENTS 195 23 219  1/1997  Germany .

*Primary Examiner*—Hoang Nguyen
*Attorney, Agent, or Firm*—Edwin E. Greigg; Ronald E. Greigg

[57] ABSTRACT

An improved adjustability and functional reliability of a device for time-dependent control of a duration of regeneration of an air dryer including a piston, which is longitudinally guided, displaceably counter to a resistance, in a cylinder by the force of a spring. The cylinder is closed by a cap, on which means for adjusting the prestressing force of the spring, supported at least indirectly on the cap, are provided. These means comprise a screw-wedge connection, which joins the cylinder and the cap to one another in such a way that by twisting the cap, an axial displacement of the cap relative to the cylinder is brought about. The device can be used for instance in air dryers for compressed air systems of motor vehicles.

7 Claims, 2 Drawing Sheets

DEVICE FOR TIME-DEPENDENT CONTROL OF THE DURATION OF REGENERATION OF AN AIR DRYER

BACKGROUND OF THE INVENTION

The invention is based on a device for time-dependent control of the duration of regeneration of an air dryer.

Such a device is already known (German Patent Disclosure DE 195 23 219 A1, the priority application for International Application PCT/DE 96/00561, in which the spring is received by the end toward the cap on a spring plate and the spring plate is supported on an adjusting screw which coaxially passes through the cap of the cylinder. The spring plate and the adjusting screw make the known device more expensive. Moreover, moisture can penetrate the cylinder along the adjusting screw and lead to corrosion of the spring and disruption of the functioning of the device.

OBJECT AND SUMMARY OF THE INVENTION

The device according to the invention has the advantage over the prior art that by dispensing with the spring plate and adjusting screw, the production of the device is made more economical, and by the omission of a bore in the cap the functional reliability of the device is increased. Nevertheless, the accuracy and simplicity with which the spring prestressing can be adjusted is preserved.

Advantageous refinements of and improvements to the device are possible with the provisions recited hereinafter.

The embodiment of the invention set forth is a screw-wedge connection that can be produced at little engineering effort or expense. The following pairings are possible: The cap and the cylinder are provided with wedge-like wall portions embodied complimentary to one another; the cap has wedge-like wall portions, while the cylinder has only the protrusions; and vice versa.

By a construction of the device, a statically determined bearing of the cap on the cylinder is attained. More than three pairs of wall portions or of a wall portion and protrusion, may be necessary for technical production reasons or because of the force load on the cap.

An advantageous refinement of the device of the invention in terms of a three-dimensionally protected yet still visually controllable disposition of the screw-wedge connection is disclosed hereinafter.

As set forth herein, various solutions are disclosed for the accuracy of adjustment of the spring prestressing: In the embodiment of the wedge-like wall portions with unprofiled flanks on the cap and cylinder, an infinitely variable adjustment is possible. The securing of this adjustment can be accomplished, given a suitable geometric design of the wedge-like wall portions and suitable materials, by static friction or by material connection (adhesive bonding). In the embodiment with a stepped or toothed flank, an incremental adjustment of the spring prestressing is possible. The axial offset of the adjacent steps or teeth may be so slight that this is virtually equivalent to an infinitely variable adjustment.

The provision recited herein is expediently employed to secure the adjustment in the stepped version. However, the form-locking connection can be released by axially displacing the cap counter to a spring force, so that a correction of the adjustment in a simple way is possible. In the version with the toothed flank, which by it's shaping already creates a form-locking connection, this can be done in a comparable way.

Special screw means is advantageous if relatively high spring forces have to be overcome, or if tool-free adjustment of the device is to be prevented anyway.

The invention will be better understood and further objects and advantages thereof will become more apparent from the ensuing detailed description of a preferred embodiment taken in conjunction with the drawings.

DESCRIPTION OF THE PREFERRED EMBODIMENTS

Figure 1:
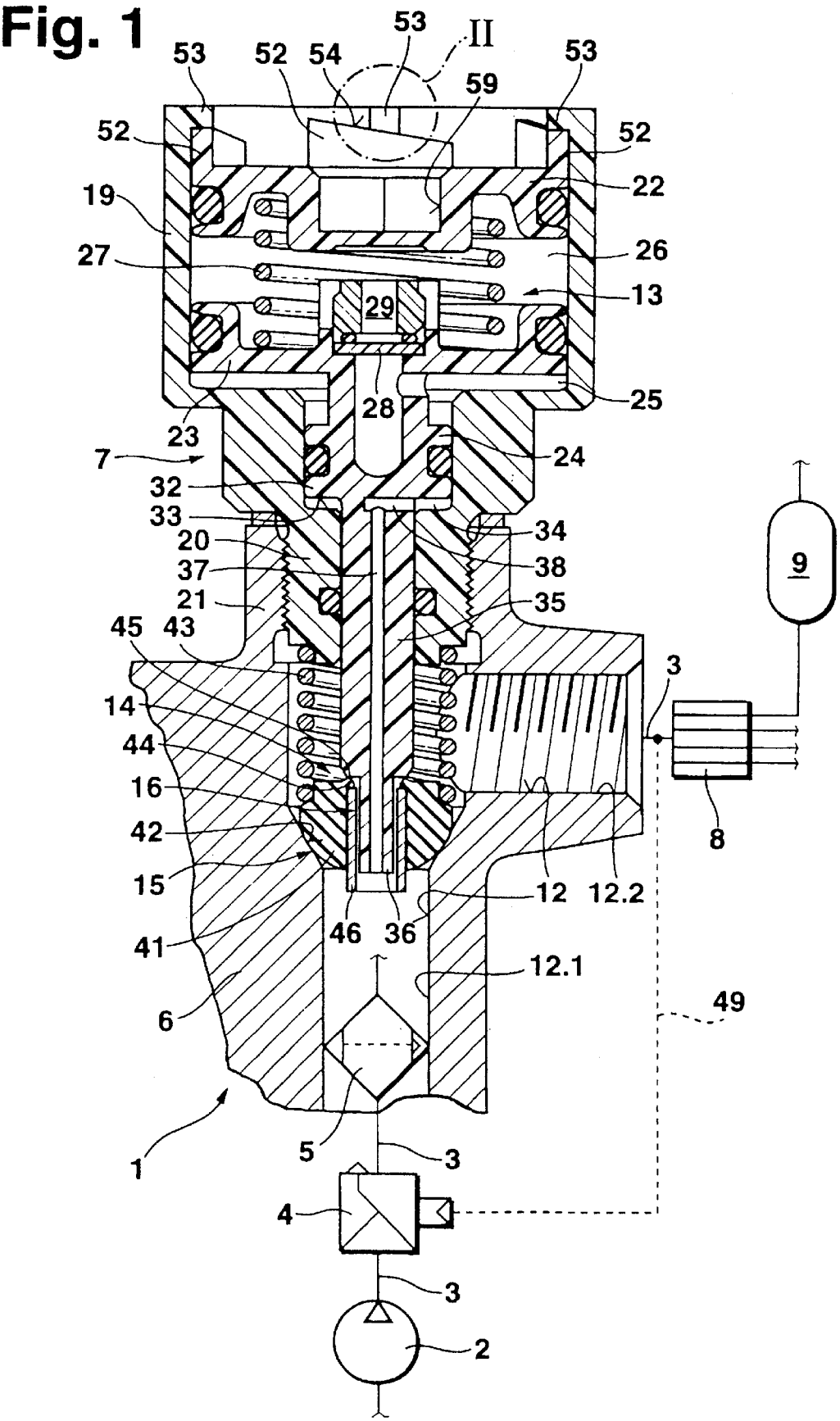
FIG. 1 is a longitudinal section through a device for time-dependent control of the duration of regeneration of an air dryer, which has a screw-wedge connection between a cylinder and its cap (detail II in FIG. 1)

A compressed air system 1 shown in FIG. 1 of the drawing shows the energy supply in the form of a circuit diagram and part of the transmission arrangement of a brake system for utility vehicles. The compressed air system 1 has an air compressor 2 from which the supply 3 with a pressure regulator 4 leads to a single-chamber air dryer 5. The constructive design of an air dryer 5 of this kind can be learned from European Patent Disclosure EP 0 036 569 A1, for example. For the sake of simplicity, the drawing therefore shows only the housing 6 of the air dryer 5, with a component unit 7 to be described below. In the direction of air supply, the supply line 3 continues to a guard valve 8. Connected to the guard valve 8 is at least one air tank 9 for compressed air, from which a consumer, such as a brake cylinder, is supplied. The consumer of the compressed air system 1 is not shown in the drawing. The air dryer 5 includes a drying agent with which moisture-laden compressed air supplied by the air compressor 2 is dehumidified before distribution to the at least one supply tank 9. The drying agent absorbs the moisture until its drying capacity is exhausted; the air dryer 5 therefore requires regeneration of it's drying agent. To that end, the component unit 7 is provided; it intervenes in an outlet line 12, carrying dried air, of the air dryer housing 6, specifically between a portion 12.1 toward the drying agent and a portion 12.2 toward the consumer. The component unit 7 comprises a device 13 for time-dependent control of the duration of regeneration, with a shut off valve 14, a check valve 15, and a throttle 16.

The device 13 has a cylindrical housing 19 (hereinafter called a cylinder) with an attachment 20, which is screwed into a stub 21 of the air dryer housing 6, the stub communicating with the outlet line 12. A control piston 23 with a formed-on tappet 24 is received in the cylinder 19 of the device 13, and this cylinder is tightly closed off from the outside by a cap 22. The control piston 23, sealed off from the cylinder 19, divides two chambers 25 and 26 from one another in the cylinder 19. A prestressed compression spring 27, which on one end engages the control piston 23 and on the other engages the cap 22, is received in the chamber 26 toward the cap. The two chambers 25 and 26 communicate through an element 28 that admits throttled air and is disposed in an opening 29 in the control piston 23. The element 28 is embodied by a disk of porous polytetrafluoroethylene.

The tappet 24, originating on the side of the control piston 23 remote from the cap, has a shoulder 32 with a control face 33, which defines a control chamber 34 of the device 13 for time-dependent control of the duration of regeneration. Downstream of the shoulder 32, the tappet 24 continues with a smaller-diameter portion 35, which passes through the attachment 20 screwed into the air dryer housing 6 and which protrudes, with a tang 36 embodied on its end, into the outlet line 23 of the air dryer housing 6. The tang 36 and the portion 35 of the tappet 24 have a longitudinal bore 37, which discharges at a side outlet 38 into the control chamber 34. Hence the control chamber 34 communicates with the portion 12.1 toward the drying agent of the outlet line of the air dryer 5.

A closing member 41 of the check valve 15 is guided longitudinally on the tang 36 of the tappet 24. The closing member 41 cooperates with a valve seat 42, which is embodied in the air dryer housing 6 and separates the two portions 12.1 and 12.2 of the outlet line 12 from one another.

The closing member 41 of the check valve 12 is loaded by a prestressed compression spring 43, which is supported on the housing attachment 20. The closing member 41 of the check valve 15 is provided, on its side remote from the valve seat of the housing, with a valve seat 44 embodied in the manner of an annular blade. This valve seat cooperates with a step 45 at the transition between the tang 36 and the portion 35 of the tappet 24. Accordingly, the tappet 24 is the closing member for the valve seat 44. The two parts 24 and 44 form the aforementioned shutoff valve 14. The centrally pierced closing member 41 of the check valve 15 is also solidly joined to a sleeve 46, which serves to guide the closing member longitudinally on the tang 36 of the tappet 24. A defined radial play is provided between the tang 36 and the sleeve 46. The longitudinal guidance of the closing member 41 of the check valve 15 on the tang 36 of the tappet 24 forms the aforementioned throttle 16, which is disposed in line with the shutoff valve 14.

The component unit 7, in cooperation with the air dryer 5, has the following mode of operation:

Compressed air fed from the air compressor 2 is carried, as already noted, through the supply line 3 to the air dryer 5 and dried there and then, overcoming the check valve 15, is dispensed via the guard valve 8, for instance to the supply tank 9. In the process, compressed air also passes through the longitudinal bore 37 of the tappet 24 to reach the control chamber 34. If the pressure level is sufficiently high, the compressed air acting on the control face 33 overcomes the force of the compression spring 27 and displaces the control piston 23 in the cylinder 19 of the device 13 for time-dependent control of the duration of regeneration. In this process, the air contained in the chamber 26 passes through the element 28 into the chamber 25. The reciprocating motion of the control piston 23 is limited by impact with the cap 22 of the cylinder 19. The control piston 23 in the device 13 is now located in its readiness position.

When an upper limit pressure in the part of the compressed air system 1 toward the consumer is reached, the pressure regulator 4 is switched over via a control line 49. The air compressor 22 now changes to its idling mode. As a result, the pressure in the portion 12.1 of the outlet line 12 toward the drying agent collapses, and the check valve 15 closes because of the action of its compression spring 43. At the same time, however, the shutoff valve 14 assumes its open position and opens up a flow course through the throttle 16, disposed in line with the shutoff valve, from the portion 12.2 toward the consumer to the portion 12.1 toward the drying agent in the outlet line 12. Dry compressed air drawn from the supply tank 9 now enters the portion 12.2 of the outlet line 12 toward the consumer and, bypassing the closed check valve 15, flows through the open shutoff valve 14 and the throttle 16, where the compressed air expands and is dispensed into the portion 12.1 of the outlet line 12 toward the drying agent. The expanded, dry regeneration air is now passed in a countercurrent process through the drying agent of the air dryer 5 and then vented to the atmosphere. In this process the air in the drying agent of the air dryer 5 absorbs trapped water, so that the air dryer is regenerated thereby; that is, it regains its capacity of extracting the moisture from the compressed air supplied.

With the collapse of the pressure in the portion 12.1 of the outlet line 12 toward the drying agent, during the idling mode of the air compressor 2, the pressure effect in the control chamber 34 is cancelled as well. The compression spring 27 thereupon begins to displace the control piston 23; air is positively displaced from the chamber 25 and is fed to the chamber 26 through the element 28. Since the element 28 exerts a throttling action on the air positively displaced from the chamber 25, the displacement motion of the control piston 23 out of the readiness position is effected relatively slowly. The displacement motion is concluded when the step 45 of the tappet 24 strikes the valve seat 44 of the shutoff valve 14 and blocks off the further admission of regeneration air through the throttle 16. The duration of the opening position of the shutoff valve 14, which begins with the switchover of the air compressor 2 to the idling position, thus determines the duration of regeneration of the air dryer 5. The duration of regeneration is predetermined by the adjustment of the device 13; the magnitude of the prestressing force of the compression spring 27 is of substantial significance in this respect. The duration of regeneration is set such than an unnecessary consumption of compressed air from the tank 9 is averted and complete regeneration of the air dryer 5 is attained.

If the consumption of compressed air in the compressed air system 1 drops below a lower limit value, the pressure regulator 4 is switched over by the control line 49 to the filling position, and the air dryer 5 is switched over to the dehumidifying mode. The compressed air filled from the air compressor 2 is dehumidified, as described above, by the regenerated air dryer 5 and dispensed to the at least one supply tank 9. At the same time, the device 13 for time-dependent control of the duration of regeneration is switched over to its readiness position.

To adjust the duration of regeneration and to compensate for tolerances of the individual parts forming the component unit that affect this duration, especially the compression spring 27 and the element 28, as well as to compensate for various frictional forces between the moving parts, the following provisions are made in the device 13:

The cylinder 19 and the cap 22 are joined to one another by a screw-wedge connection in such a way that by twisting the cap, its axial displacement relative to the cylinder is brought about. This axial displacement causes a change in the prestressing force of the compression spring 27.

The change in the spring force setting causes the displacement of the control piston 23 in the cylinder 19, counter to the resistance presented by the element 28, at a varying reciprocating speed: An increased prestressing force shortens the duration of regeneration, and a decreased prestressing force lengthens it. Because of the operative principle of the screw-wedge connection, when the prestressing force of the compression spring 27 is set, a change in position of the cap 22 acting as a stop for the control piston 23 also takes place. As a result, once again a change in the duration of regeneration is attained: A reduced distance between the cap 22 and the control piston 23 shortens the duration of regeneration, and an increased distance lengthens it.

To realize the screw-wedge connection, the cap or the cylinder may be provided with wedge-like wall portions, which are engaged by wedge-like wall portions or protrusions of the respectively other part. In the exemplary embodiment, the cap 22 that engages the inside of the cylinder 19 is provided on its side remote from the spring with wedge-like wall portions 52, while the cylinder 19 has protrusions 53 on its inside circumference. The meshing pairs of wall portion 52 and protrusion 53 are disposed, distributed uniformly, over the circumference of the cap 22 and the cylinder 19; in the present exemplary embodiment, there are four pairs, each comprising one wall portion 52 and one protrusion 53, in other words pairs spaced apart by 90° from one another. The protrusion 53 is embodied as relatively narrow, while the wedge-like wall portion 52 has a considerably greater width in the circumferential direction. However, embodiments are also possible in which instead of the protrusion 53 on the inside circumference of the cylinder 19, considerably wider wedge-like wall portions are formed on, for instance with a width corresponding to the wall portions 52 of the cap 22. The screw-wedge connection can also be modified in such a way that the cap 22 is provided with protrusions 53, while the wedge-like wall portions 52 are formed on the cylinder 19.

In the exemplary embodiment, the wedge-like wall portion 52 is provided with an unprofiled flank 54, extending obliquely to the longitudinal axis of the cylinder 19, and this flank is engaged by the correspondingly shaped protrusion 53. If the wedge angle is very small, the static friction between the wall portion 52 and the protrusion 53 may suffice to protect the cap 22 against an undesired independent return to its former position. An advantage in this embodiment is the infinitely variable adjustment of the screw-wedge connection. An incremental adjustment of the screw-wedge connection, conversely, is provided in the variants of FIGS. 2 and 3.

Figure 2:
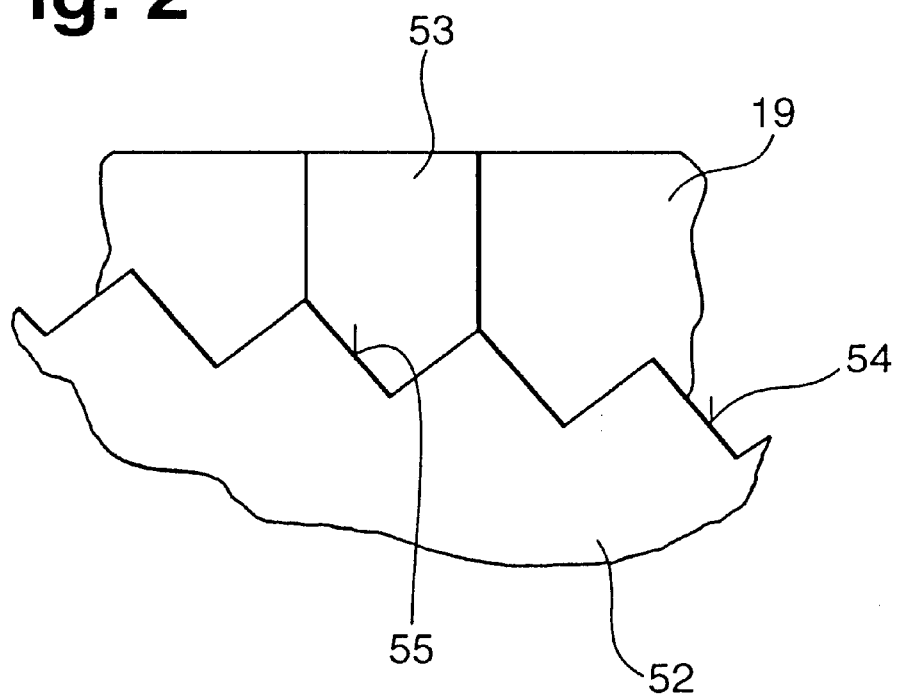
FIGS. 2 and 3 show variants of the screw-wedge connection of FIG. 1 on a larger scale.

The variant of FIG. 2 shows a wedge-like wall portion 52 with a toothed flank 54. The protrusion 53 of the cylinder 19 is adapted accordingly; that is, it is embodied as toothlike counter to the wedge-like wall portion 52 and engages a tooth gap 55 of the wall portion. If both the cylinder 19 and the cap 22 are equipped with wedge-like wall portions 52, then the flank 54 thereof should be embodied as toothed in complementary fashion. The variant of the screw-wedge connection in FIG. 2 is secured against independent adjustment by its form-locking connection between the wedge-like wall portion 52 and the protrusion 53.

Figure 3:
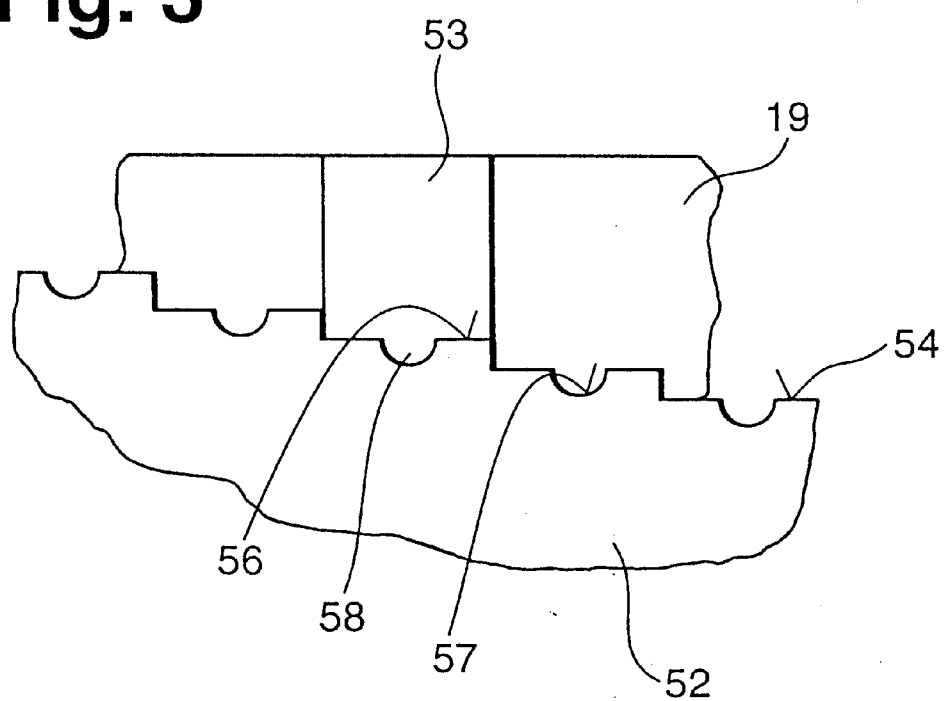

In the variant in FIG. 3, the wedge-like wall portion 52 is provided with a stepped flank 54. Since the steps 56 of the wall portion 52 are each located in a plane extending at right angles to the longitudinal axis of the cylinder 19, a form-locking connection is additionally provided between the respective step 56 and the protrusion 53. To that end, each step 56 has a semicylindrical groove 57 extending radially to the longitudinal axis of the cylinder 19. The correspondingly shaped protrusion 53, conversely, is provided with a correspondingly extending semicylindrical lug 58 for engagement with the groove 57.

As already noted, the adjustment of the screw-wedge connection is accomplished by twisting the cap 22 relative to the cylinder 19. In the variants of the screw-wedge connection shown in FIG. 2 and 3, at the beginning of the adjustment operation an axial displacement of the cap 22 counter to the tightening force of the compression spring 27 is additionally necessary, in order to undo the form-locking connection between the wedge-like wall portion 52 and the protrusion 53. The twisting motion of the cap 23 can be effected after that. Once the adjustment operation is concluded, the form-locking connection is re-established by axially displacing the cap 22 in the opposite direction. For twisting the cap 22, in this exemplary embodiment the cap is provided with a central indentation 59 in the form of a hexagonal socket (FIG. 1). By means of a socket wrench (not shown) that engages the indentation 59, the cap 22 can be moved. In a departure from the exemplary embodiment, it is also possible to provide the cap with a hexagonal protrusion, crosswise slot, rib, or the like for access by another kind of turning tool.

In the exemplary embodiment, the screw-wedge connection is shown only schematically; production-related and mounting-related requirements are not taken into account. In an actual constructed embodiment, it is therefore expedient for the protrusion 53 to be recessed radially into an indentation of the cylinder 19, so that the cap 22 can be introduced into the cylinder 19 in a simple way. In that case, the wedge-like wall portion 52 should be embodied such that it engages the inside of the indentation. When the cap 22 is mounted, a radially inward-oriented elastic resilience of the wall portion 22 is then necessary.

The foregoing relates to a preferred exemplary embodiment of the invention, it being understood that other variants and embodiments thereof are possible within the spirit and scope of the invention, the latter being defined by the appended claims.

I claim:

1. A device (13) for time-dependent control of the duration of regeneration of an air dryer (5), for compressed air systems (1) in motor vehicles, comprising a piston (23), which is longitudinally guided, displaceable counter to a resistance, in a cylinder (19) by the force of a spring (27),
   a cap (22), which closes off the cylinder (19) and on which means are provided for adjusting the prestressing force of the spring (27) that is supported at least indirectly on the cap (22),
   the cylinder and the cap (22) are joined to one another by a screw-wedge connection (52, 53) in such a way that by twisting the cap (22), its axial displacement relative to the cylinder (19) is accomplished.

2. The device according to claim 1, in which the cap (22) and the cylinder (19) are provided with wedge-like wall portions (52), which are engaged by wedge-like wall portions (52) or protrusions (53) of the respectively other part.

3. The device according to claim 2, in which at least three wedge-like wall portions (52) or protrusions (53) are disposed, in a uniform distribution over the circumference, on the cap (22) or cylinder (19).

4. The device according to claim 2, in which the cap (22) engages the inside of the cylinder (19) and is provided, on a side remote from the spring, with the wedge-like wall portions (52) or the protrusions (53), which the cylinder (19) has the wedge-like wall portions (52) or protrusions (53) on its inside circumference.

5. The device according to claim 2, in which the wedge-like wall portions (52) of the cap (22) or of the cylinder (19) have an unprofiled or stepped or toothed flank (54), while the protrusions (53) of the other part are unprofiled or have a form embodied to fit a step (56) or a tooth gap (55) of the wedge-like wall portion (52).

6. The device according to claim 5, in which a form-locking connection (57, 58) is provided between the step (56) and the protrusion (53).

7. The device according to claim 1, in which the cap (22) is embodied with a hexagon socket or a hexagonal protrusion, a crosswise slot, a rib, for engagement by a turning tool.

* * * * *